(12) United States Patent
Bennett (10) Patent No.: US 9,264,987 B2
(45) Date of Patent: *Feb. 16, 2016

(54) WIRELESS COMMUNICATION DEVICE CAPABLE OF UTILIZING MULTIPLE RADIO ACCESS TECHNOLOGIES

(71) Applicant: Broadcom Corporation, Irvine, CA (US)

(72) Inventor: James Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/658,977

(22) Filed: Mar. 16, 2015

(65) Prior Publication Data

US 2015/0189587 A1 Jul. 2, 2015

Related U.S. Application Data

(63) Continuation of application No. 13/335,449, filed on Dec. 22, 2011, now Pat. No. 9,030,969.

(60) Provisional application No. 61/562,196, filed on Nov. 21, 2011.

(51) Int. Cl.
*H04W 36/00* (2009.01)
*H04W 52/02* (2009.01)
(Continued)

(52) U.S. Cl.
CPC .............. *H04W 52/0203* (2013.01); *H04L 5/16* (2013.01); *H04W 36/08* (2013.01); *H04W 88/10* (2013.01)

(58) Field of Classification Search
CPC ......... H04L 5/06; H04L 5/16; H04W 72/005; H04W 52/0203; H04W 36/08; H04W 88/10
See application file for complete search history.

(56) References Cited

U.S. PATENT DOCUMENTS

| 7,684,800 B2 | 3/2010 | Kuhn et al. |
| 7,957,352 B2 | 6/2011 | Vanghi et al. |

(Continued)

FOREIGN PATENT DOCUMENTS

| CN | 1887020 A | 12/2006 |
| CN | 1917704 A | 2/2007 |

(Continued)

OTHER PUBLICATIONS

Office Action directed to related Korean Patent Application No. 10-2012-0132440, dated Mar. 31, 2014; 3 pages.

(Continued)

*Primary Examiner* — Jay P Patel
(74) *Attorney, Agent, or Firm* — Sterne, Kessler, Goldstein & Fox P.L.L.C.

(57) ABSTRACT

A wireless communication device is disclosed that is capable of utilizing multiple radio access technologies (RATs) in various coordinated ways so as to optimize, and enhance the versatility, of the device's communication capabilities. One or more RATs may be selected for use, either alone or in cooperation with each other, based on various conditions, such as channel conditions, traffic, data type, and priority. When conditions change, the originally-selected communication scheme may no longer be preferred. Consequently, the device can initiate a handover to another communication scheme. Transmitters corresponding to RATs that are not currently selected are controlled to enter a low-power state in order to conserve power. However, in some circumstances, the device may utilize both RATs simultaneously. For example, redundant communications can be made over both RATs for error-reduction or other purposes, and partial communications can be made over multiple RATs for increased speed and bandwidth, among other reasons.

20 Claims, 7 Drawing Sheets

(51) Int. Cl.
*H04W 36/08* (2009.01)
*H04L 5/16* (2006.01)
*H04W 88/10* (2009.01)

(56) References Cited

U.S. PATENT DOCUMENTS

| | | | |
|---|---|---|---|
| 8,064,400 | B2 | 11/2011 | Shaheen |
| 8,462,746 | B2 | 6/2013 | Bitran et al. |
| 8,644,273 | B2 | 2/2014 | Choi et al. |
| 8,687,602 | B2 | 4/2014 | Choi |
| 2010/0284279 | A1 | 11/2010 | Tripathi et al. |
| 2011/0044218 | A1 | 2/2011 | Kaur et al. |
| 2011/0134746 | A1 | 6/2011 | Liu et al. |
| 2011/0171953 | A1* | 7/2011 | Faccin et al. ............... 455/426.1 |
| 2012/0020256 | A1 | 1/2012 | Tujkovic et al. |
| 2012/0033589 | A1 | 2/2012 | Zheng |
| 2012/0063373 | A1 | 3/2012 | Chincholi et al. |
| 2012/0093009 | A1 | 4/2012 | Wang et al. |
| 2012/0114540 | A1 | 5/2012 | Chin et al. |
| 2012/0120821 | A1 | 5/2012 | Kazmi et al. |
| 2012/0120892 | A1* | 5/2012 | Freda et al. .................... 370/329 |
| 2012/0140743 | A1 | 6/2012 | Pelletier et al. |
| 2012/0163198 | A1 | 6/2012 | Chin et al. |
| 2012/0163248 | A1 | 6/2012 | Chin et al. |
| 2012/0230268 | A1 | 9/2012 | Marinier et al. |
| 2012/0307697 | A1* | 12/2012 | Mukhopadhyay ............ 370/311 |
| 2012/0307722 | A1 | 12/2012 | Thach |
| 2012/0327850 | A1 | 12/2012 | Wang et al. |
| 2012/0329395 | A1 | 12/2012 | Husted et al. |
| 2012/0329515 | A1 | 12/2012 | Husted et al. |
| 2013/0016635 | A1 | 1/2013 | Linsky et al. |
| 2013/0021932 | A1* | 1/2013 | Damnjanovic et al. ....... 370/252 |
| 2013/0028117 | A1* | 1/2013 | Montojo et al. ............... 370/252 |
| 2013/0028151 | A1 | 1/2013 | Ning et al. |
| 2013/0044709 | A1 | 2/2013 | Adjakple et al. |
| 2013/0065525 | A1 | 3/2013 | Kiukkonen et al. |
| 2013/0114540 | A1 | 5/2013 | Ding et al. |
| 2013/0121145 | A1 | 5/2013 | Draznin et al. |
| 2013/0128778 | A1 | 5/2013 | Bennett |
| 2013/0143502 | A1* | 6/2013 | Kazmi et al. .................... 455/62 |
| 2013/0182583 | A1* | 7/2013 | Siomina et al. ............... 370/252 |
| 2013/0198838 | A1* | 8/2013 | Schmidt et al. ................. 726/22 |
| 2013/0287014 | A1* | 10/2013 | Yuk et al. ...................... 370/338 |
| 2013/0322302 | A1 | 12/2013 | Gholmieh et al. |
| 2013/0322395 | A1 | 12/2013 | Kazmi et al. |
| 2014/0043979 | A1* | 2/2014 | Etemad et al. ................. 370/237 |
| 2014/0050148 | A1 | 2/2014 | Choi |
| 2014/0094188 | A1 | 4/2014 | Kazmi et al. |
| 2014/0148143 | A1 | 5/2014 | Choi et al. |
| 2014/0153489 | A1* | 6/2014 | Perras et al. .................. 370/328 |
| 2014/0235242 | A1* | 8/2014 | Granzow et al. ............. 455/436 |
| 2014/0341109 | A1* | 11/2014 | Cartmell et al. .............. 370/328 |

FOREIGN PATENT DOCUMENTS

| | | |
|---|---|---|
| CN | 102202369 A | 9/2011 |
| KR | 10-2007-0011184 A | 1/2007 |

OTHER PUBLICATIONS

Office Action directed to related Chinese Application No. 201210472957.7, dated Jan. 7, 2015; 6 pages.
English language abstract of Chinese Patent Publication No. CN 102202369 A, published Sep. 28, 2011; 1 page.
Chinese Office Action directed toward related Chinese Application No. 201210472957.7, dated Oct. 10, 2015; 7 pages.

* cited by examiner

WIRELESS COMMUNICATION DEVICE CAPABLE OF UTILIZING MULTIPLE RADIO ACCESS TECHNOLOGIES

CROSS REFERENCE TO RELATED APPLICATIONS

This application is a Continuation Application of U.S. patent application Ser. No. 13/335,449, filed Dec. 22, 2011, which claims the benefit of U.S. Provisional Patent Application 61/562,196, filed Nov. 21, 2011, which are incorporated by reference herein in their entirety.

FIELD OF INVENTION

The invention relates to wireless communications, and more specifically to a wireless communication device that is capable of utilizing more than one radio access technology.

BACKGROUND

Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including simple amplitude modulation (AM), simple frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

Different wireless communication devices may communicate using any one of different radio access technologies (RATs), including WiMAX, LTE, 4G, 3G, and WiFi, among others. However, because each wireless communication device is typically capable of communicating using only one of the RATs, the device is significantly restricted in its versatility, and may be confined to a communication path of lower quality or having lower bandwidth.

Alternatively, some devices may be capable of communicating using multiple RATs. However, each RAT is typically only used when communicating with a specific device using the same RAT. For example, a laptop computer may include both WiFi and 3G capabilities, but only uses its WiFi to communicate with a home network and uses its 3G to communicate with a base station within a cellular network. Similarly, a mobile phone may include both LTE and 3G capabilities, but always communicates over LTE when available, and only communicates over 3G when LTE is unavailable.

Current communication standards (e.g., LTE) provide little if any support for cooperation between RATs. For example, such communication standards may allow for full duplex RAT to RAT handovers. In such current standards, more complex RAT to RAT interaction is not defined or supported, because, among other reasons, conventional communication flows via different RATs are generally considered to be unrelated. Such standards also define various communication techniques such as channelization, channel bonding, cross channel encoding, etc. for use entirely within a single RAT.

Regardless of whether the device includes only a single RAT or is capable of communicating using multiple RATs, traditional wireless communication devices are severely restricted in their abilities to communicate with other wireless communication devices.

BRIEF DESCRIPTION OF THE DRAWINGS/FIGURES

Exemplary embodiments are described with reference to the accompanying drawings. In the drawings, like reference numbers indicate identical or functionally similar elements. Additionally, the left most digit(s) of a reference number identifies the drawing in which the reference number first appears.

Embodiments will now be described with reference to the accompanying drawings.

DETAILED DESCRIPTION

The following Detailed Description refers to accompanying drawings to illustrate exemplary embodiments. References in the Detailed Description to "one exemplary embodiment," "an exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s)

to affect such feature, structure, or characteristic in connection with other exemplary embodiments whether or not explicitly described.

The exemplary embodiments described herein are provided for illustrative purposes, and are not limiting. Other embodiments are possible, and modifications may be made to the exemplary embodiments within the spirit and scope of the present disclosure. Therefore, the Detailed Description is not meant to be limiting. Rather, the scope of the present disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal their general nature that others can, by applying knowledge of those skilled in relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the embodiments is to be described in terms of wireless communication (specifically cellular communication), those skilled in the relevant art(s) will recognize that the embodiments may be applicable to other communications that use wired or other wireless communication methods without departing from the spirit and scope of the present disclosure.

An Exemplary Wireless Communications Environment

Figure 1:
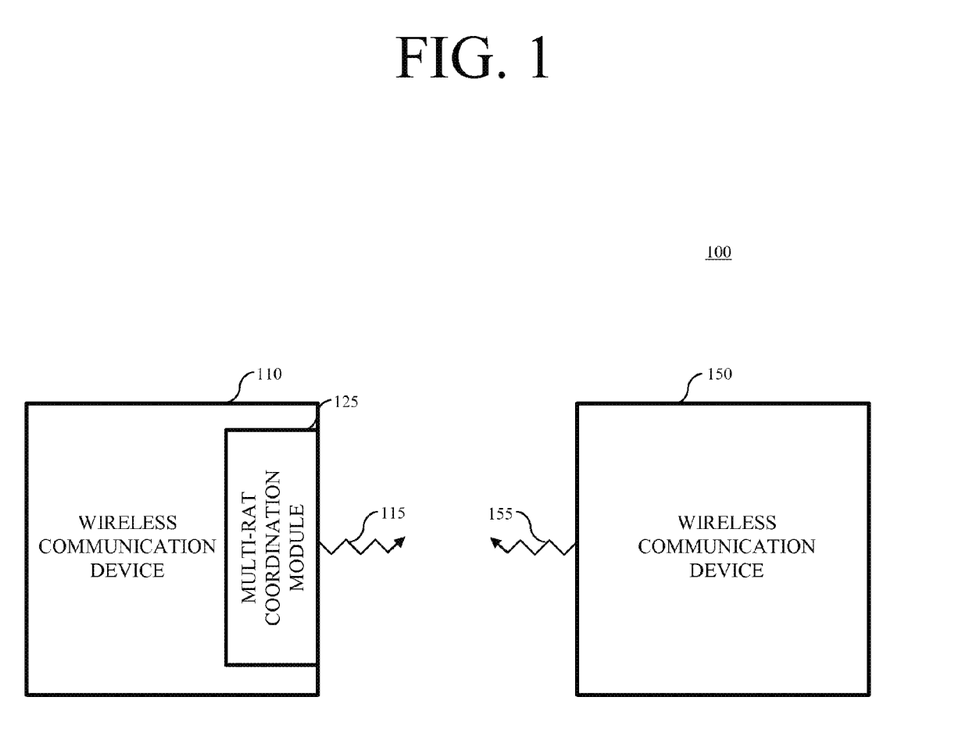
FIG. 1 illustrates a block diagram of an exemplary wireless communication environment.

FIG. 1 illustrates a block diagram of a wireless communication environment 100 according to an exemplary embodiment. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a first wireless communication device 110 and a second wireless communication device 150. The first wireless communication device 110 may represent an exemplary embodiment of a user equipment and the second wireless communication device 150 may represent an exemplary embodiment of a second user equipment or a base station within a cellular communications network.

The first wireless communication device 110 transmits a first wireless signal 115 toward the second wireless communication device 150 using any acceptable modulation scheme. The second wireless communication device 150 receives the first wireless signal 115. The second wireless communication device 150 processes the received first communication signal and, if necessary, transmits a second wireless signal 155 back to the first wireless communication device 110. In this manner, the first wireless communication device 110 and the second wireless communication device 150 exchange information ("communicate") with one another.

Figure 2:
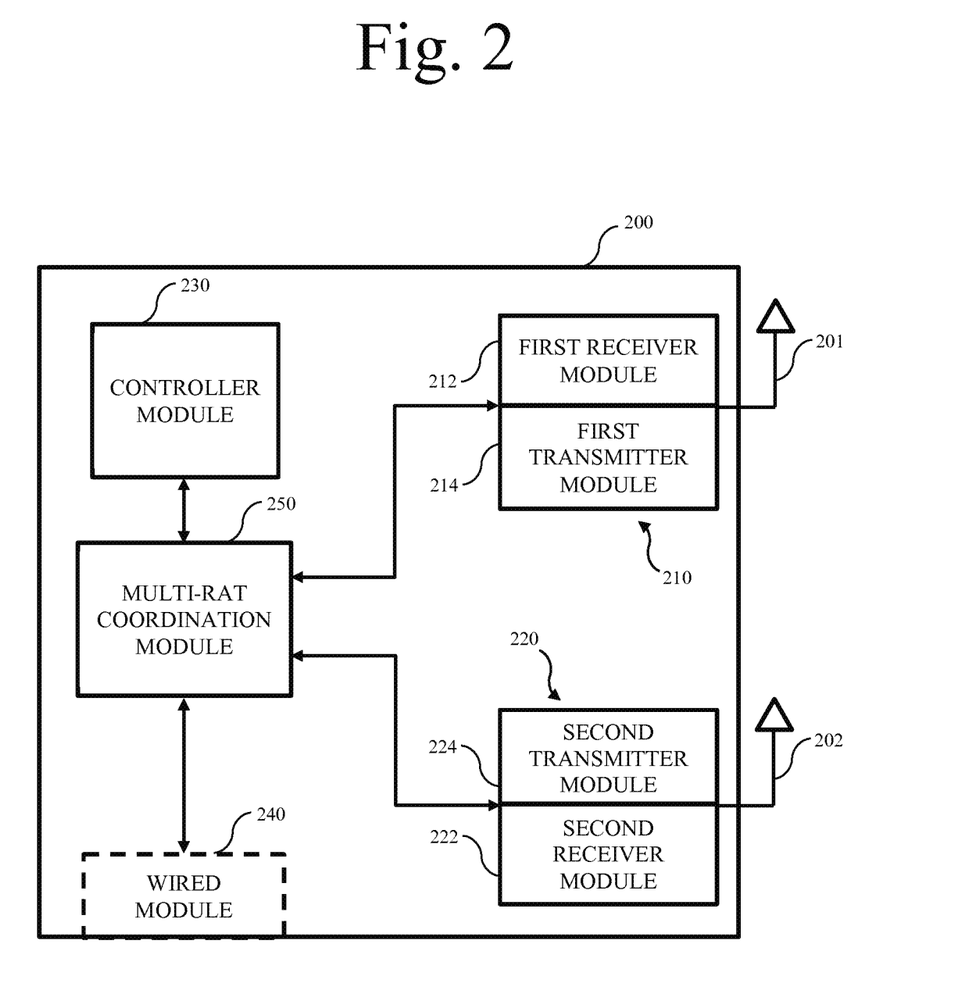
FIG. 2 illustrates a block diagram of an exemplary wireless communication device that is implemented as part of the wireless communication environment of FIG. 1.

At least the first wireless communication device 110 is capable of using one or more of multiple RATs. Specifically, the first wireless communication device 110 includes a multi-RAT coordination module 125 that controls communications over the multiple RATs. The multi-RAT coordination module 125 may select an individual RAT based on various conditions, such as channel conditions, traffic, data type, and data priority, may be capable of changing a RAT selection as those conditions change, and may be capable of coordinating communications between RATs as an application may warrant. These aspects, as well as additional aspects of the first wireless communication device 110 and the multi-RAT coordination module 125 are discussed in further detail in the following descriptions, An Exemplary Wireless Communication Device FIG. 2 illustrates a block diagram of a wireless communication device 200 that is implemented as part of the wireless communication environment 100 according to an exemplary embodiment. The wireless communication device 200 includes a first RAT module 210, a second RAT module 220, and a multi-RAT coordination module 250, and may represent an exemplary embodiment of the first wireless communication device 110. It should be understood, however, that the wireless communication device 200 can include more than two RAT modules.

The wireless communication device 200 includes a controller module 230 that performs most of the functions within the wireless communication device 200, including background processing, signal processing, and control. The controller module 230 is connected to each of the first RAT module 210 and the second RAT module 220 through the multi-RAT coordination module 250. The first RAT module 210 receives signals from, and transmits signals to, the wireless communication environment 100 using a first RAT via an antenna 201. The second RAT module 220 receives signals from, and transmits signals to, the wireless communication environment 100 using a second RAT via an antenna 202. Those skilled in the relevant art(s) will recognize that the antenna 201 and the antenna 202 may each include multiple antennas, or may together constitute a single antenna shared between the first RAT module 210 and the second RAT module 220. The wireless communication device 200 may also optionally include a wired module 240 for communicating with another device over a wired connection.

The first RAT module 210 includes a first receiver module 212 for receiving signals from the wireless communication environment 100, and a first transmitter module 214 for transmitting signals to the wireless communication environment 100 using a first RAT. The second RAT module 220 includes a second receiver module 222 for receiving signals from the wireless communication environment 100, and a second transmitter module 224 for transmitting signals to the wireless communication environment 100 using a second RAT, Upon receipt of signals from the wireless communication environment 100, the first RAT module 210, the second RAT module 220 and/or the wired module 240 perform front-end processing on the received signals and forward the received signals to the controller module 230 via the multi-RAT coordination module 250. The front-end processing may include demodulation and decoding, among other operations. The controller module 230 may control the operation of, and generate signals for transmission by, one or more of the first RAT module 210, the second RAT module 220, the wired module 240, and the multi-RAT coordination module 250.

The multi-RAT coordination module 250 controls coordinated communications of the first RAT module 210 and the second RAT module 220. For example, the multi-RAT coordination module 250 may select one or more of the RAT modules for communication, initiate full/half duplex handovers, control signaling via an upstream/downstream direction in a first RAT to service a downstream/upstream direction in a second RAT, control power usage of the RAT modules, coordinate cross-RAT channel bonding/encoding, among others, as will be discussed in further detail below.

An Exemplary Multi-RAT Coordination Module

Figure 3:
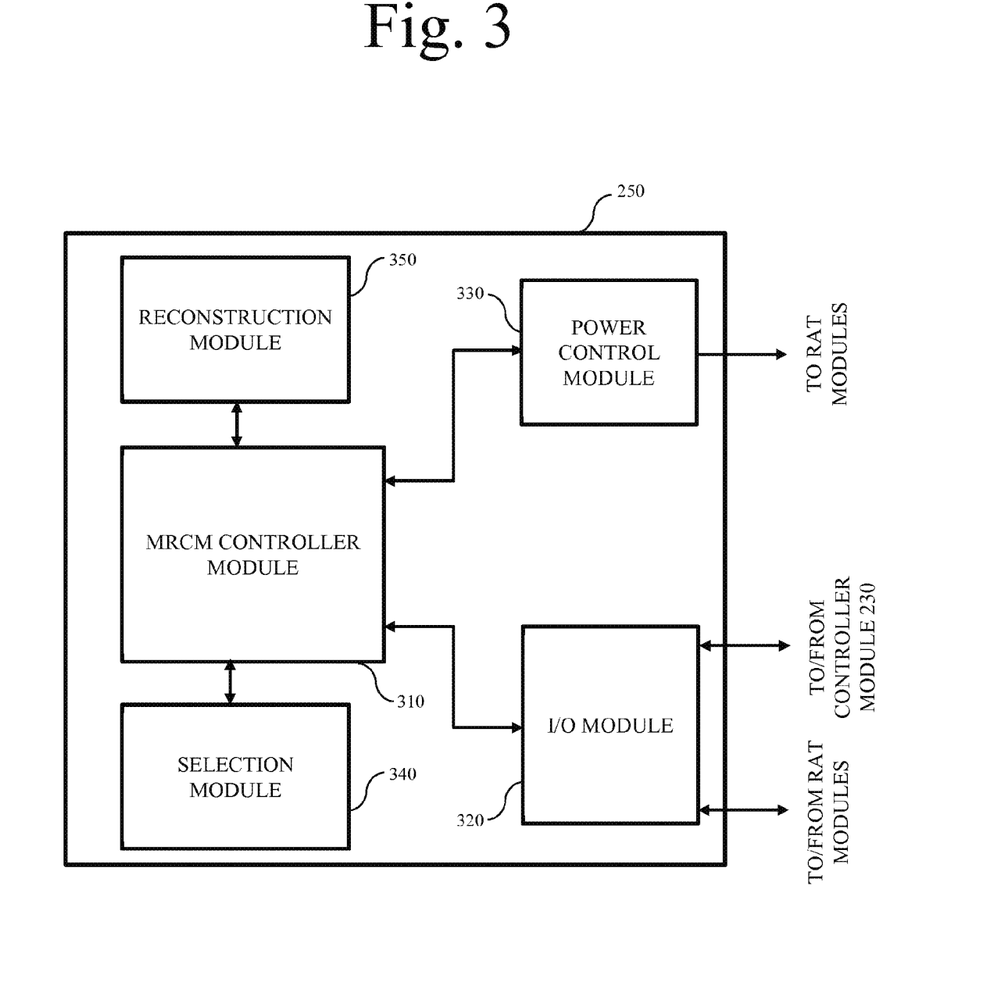
FIG. 3 illustrates a block diagram of an exemplary multi-RAT coordination module that may be implemented as part of the wireless communication device of FIG. 2.

FIG. 3 illustrates a block diagram of a multi-RAT coordination module 250 that may be implemented by the wireless communication device 200 according to an exemplary embodiment. The multi-RAT coordination module (MRCM) 300 includes at least one of an MRCM controller module 310, an I/O module 320, a power control module 330, a selection module 340, and a reconstruction module 350, depending on application, and may represent an exemplary embodiment of the multi-RAT coordination module 250 of the wireless communication device 200.

The MRCM controller module 310 controls general operations and signal routing within the MRCM 300. The MRCM controller module 310 can perform general signal analyses/operations, and initiate operations and calculations by the remaining modules within the MRCM 300. The MRCM controller module 310 communicates with the first RAT module 210 and the second RAT module 220 of the wireless communication device 200 via the I/O module.

The MRCM 300 includes the power control module 330, selection module 340 and reconstruction module 350 that help facilitate coordinated multi-RAT communications. For example, the selection module 340 determines, based on several factors, whether to communicate using only the first RAT module 210, only the second RAT module 220, or both the first RAT module 210 and the second RAT module 220 in either a half-duplex or full-duplex mode. The selection module 340 also determines whether to perform a handover from a current configuration to an alternative configuration.

In addition, the power control module 330 controls the power consumption of the first RAT module 210 and the second RAT module 220, and the reconstruction module 350 reconstructs a signal from received portions of that signal.

Further details regarding the various components of the MRCM 300, and its various configurations will be discussed in detail below with respect to various configurations of the wireless communication device 200.

Exemplary Configurations of the Wireless Communication Device

Utilizing the functionality of the MRCM 250, the wireless communication device 200 is capable of coordinating communication using its multiple RATs to provide significant communication versatility, and many corresponding benefits. Several different exemplary configurations of the wireless communication device 200, as well their corresponding benefits, will now be discussed with reference to FIGS. 1 and 2.

Power Control

During communication, one or more of the first RAT module 210 and the second RAT module 220 may not be in use. This may occur when the MRCM 250 selects a communication configuration that uses only one of the first RAT 210 or the second RAT, or selects a communication configuration in which one or more of the first RAT 210 and the second RAT 220 have periods of inactivity, among others. During such periods of inactivity, the inactive RAT module(s) unnecessarily consume power. Therefore, the power control module 330 of the MRCM 250 controls the inactive RAT module to be in a low-power state during the period of inactivity.

Waking Up

In typical wireless communication devices, a radio module may occasionally enter a low-power state, such as a sleep mode. In order to determine when the radio module must wake, the radio module is periodically set to a high-power state (i.e., waked) in order to sync with a beacon and determine whether any messages designated for the device are pending. This obviously consumes significant power and computing.

Radio receivers, such as the first receiver module 212 and the second receiver module 222 consume relatively small amounts of power compared with other radio components, and therefore may be controlled to remain on during inactive periods. Transmitters, on the other hand, consume significant amounts of power.

Therefore, one option for determining when the inactive RAT module must wake is for the power control module 330 to set only the first transmitter module 214 and/or the second transmitter module 224 to a low-power state when its corresponding RAT module is not in use. In this manner, the receiver module of the inactive RAT module can remain on in order to monitor incoming signals from other wireless communication devices so as to determine when the corresponding transmitter module is needed.

Alternatively, provided that the wireless communication device 200 is communicating using one of the RAT modules, it can use that RAT module and the MRCM 250 to determine when to wake the inactive RAT module.

As one example, the wireless communication device 200 is currently communicating using the first RAT module 210, and the power control module 330 has set the second RAT module 220, including the second transmitter module 224 and/or the second receiver module 222, to be in a low-power state. The MRCM 250 then controls the first RAT module 210 to request and receive control signals designated for the second RAT module 220 in a half-duplex path using the second RAT. This may require coordination with a serving base station having similar capabilities as the wireless communication device 200, but will have significant advantages over typical methods.

Many other control processing may also be available using this configuration. For example, account information, sign-in and access grants for one RAT could be processed using the other RAT. Such access processing could be required on a half-duplex basis, and handled via one or more current or alternate RAT half-duplex pathways.

Establish Communication

As discussed above, both the first receiver module 212 and the second receiver module 222 operate to receive signals from the wireless communication environment 100. Once the first receiver module 212 or the second receiver module 222 receive signals from the wireless communication environment 100, the controller module 230 processes the received signals. The MRCM 250 may also control the first transmitter module 314 and/or the second transmitter module 324 to enter a low power state in accordance with the received signals.

For example, the I/O module 320 receives the incoming signals from one of the RAT modules and forwards the received signals to the MRCM controller module 310. If the first receiver module 312 receives the signal, the MRCM controller module 310 instructs the power control module 330 to set the second transmitter module 224 to a low-power state. If at any time, the second receiver module 222 receives a signal, the MRCM controller module 310 detects the recipient of the signal and instructs the power control module 330 to set the second transmitter module 224 to a high-power state. Further power control can be performed in accordance with the above.

In one example, because the first receiver module 212 received the initial signals using the first RAT, the controller module 230 generates response signals to be transmitted by the first transmitter module 214 using the first RAT. The first transmitter module 214 then transmits the response signals to the other wireless communication device using the first RAT. In this manner, the two wireless communication devices can establish communication.

During the initial establishment of communication, the wireless communication devices share information regarding their communication capabilities. For example, the wireless communication device 200 indicates in its response that it can fully communicate over the first RAT and/or the second RAT. The wireless communication device 200 also requests the communication capabilities of the other wireless communication device. If the other wireless communication device responds that it is only capable of communicating over the first RAT, or only over the first RAT and a third RAT (unsupported by the wireless communication device 200), then the selection module 340 selects only the first RAT for further communication. However, for purposes of this discussion, it is presumed that the other wireless communication device is capable of communicating over the first RAT and the second RAT.

During the initiation of communication, the selection module 340 of the MRCM 250 may also determine the RAT by which to communicate. This decision may be made based on several criteria, including RAT traffic, channel conditions, SNR, etc. After the selection module 340 has selected the RAT to be used by the devices, signals received from the controller module 230 by the MRCM 250 are forwarded by the I/O module 320 to the corresponding transmitter, and the power control module 330 powers down other transmitters that are not selected or not in use. For example, if the devices agreed to communicate using the second RAT in the above example, the I/O module 320 sends outgoing signals to the second transmitter module 224 and the power control module 330 sets the first transmitter module 214 to a low-power state.

Once the devices have completed the initiation, the wireless communication device 200 begins sending and receiving information signals with the other wireless communication device using the desired RAT. In this manner, the devices can communicate with each other over a preferred RAT without consuming significant additional amounts of power. In addition, the devices can power down other RATs which may be less power efficient than the preferred RAT.

Coordinated Multi-RAT Communication

As discussed above, the selection module 340 of the MRCM 250 may select one of the first RAT or the second RAT for communications based on various selection parameters. However, under many circumstances, it may be beneficial not to limit communication to a single RAT, but rather to utilize both RATs in either a half-duplex or full-duplex manner in order to enhance communications, as will be discussed in further detail below.

1. Half-Duplex Communication

In a half-duplex configuration, the wireless communication device 200 transmits signals using only one of the RATs, and receives signals using at least one receiver of the other RAT.

The selection module 340 may determine to communicate with another wireless communication device using a half-duplex communication configuration during communication initiation based on several factors.

For example, based on signals received from the other wireless communication device, the selection module 340 may determine that the first RAT has a strong downlink channel, but a poor uplink channel, whereas the second RAT has a strong uplink channel, but a poor downlink channel. In this scenario, the selection module 340 may set the first RAT module 210 for downlink communications and set the second RAT module 220 for uplink communications, provided that the other wireless communication device is capable of communicating in this manner.

Based on this configuration, the MRCM controller module 310 instructs the power control module 330 to set the first transmitter module 214 and the second receiver module 222 to be in a low-power state, and the first receiver module 212 and the second transmitter module 224 to be in a high-power state. In this manner, the wireless communication device 200 may receive signals via the first receiver module 212, and transmit signals via the second transmitter module 224.

For example, the selection module 340 may select half-duplex RAT communication in consideration of power or cost savings. As examples, the selection module 340 may determine transmission over the first RAT to cost significant power compared to the second RAT, or may determine the reception of signals over the second RAT to be pricey compared with the first RAT.

The selection module 340 may also select half-duplex communication based on data type of information to be exchanged between the wireless communication device 200 and the other wireless communication device. For example, VoIP data requires specific QoS (quality of service) standards that may require transmission over a particular RAT that is less efficient for other data. Consequently, the selection module 340 may select half-duplex communication in order to transmit data over the VoIP-preferred RAT, and receive data using a more efficient RAT.

In addition, the selection module 340 may select half-duplex communication based on whether a first RAT backhaul is common or bridged with a second RAT backhaul. For example, if a common or bridged backhaul exists for the first and second RATs, information can easily be exchanged between the two RATs, which permits more flexibility in transmission schemes, as discussed in further detail below.

The wireless communication devices may also or alternatively choose to use mixed communication based on numerous additional/different criteria.

2. Full-Duplex Communication

In full-duplex configuration, the selection module 340 utilize both RAT transmitters for communication in a coordinated shared or simultaneous manner.

The selection module 340 may select full-duplex communication for many of the same reasons it may select half-duplex communication, discussed above. In the selection based on data type, for example, the selection module 340 can select the first RAT for VoIP transmission and selects the second RAT for transmission of the non-VoIP information. Other reasons for specifically selecting to communicate using full-duplex RAT communication are discussed in detail below.

Increased Bandwidth

By operating multiple transmitters simultaneously, the wireless communication device 200 is capable of transmitting data using each of the operating transmitters. Consequently, transmission throughput and bandwidth of the wireless communication device 200 can be increased. The receive bandwidth/throughput can also be increased by simultaneously operating multiple receivers, which applies both to full-duplex RAT communication and half-duplex RAT communication.

Redundancy

Both the first transmitter module 214 and the second transmitter module 224 can also be used together for redundancy purposes. For example, the selection module 340 may determine, based on one or more factors, that the likelihood of receiving accurate signals is low. Consequently, the selection module 340 can set the wireless communication device 200 to send and receive the same signals using both the first RAT and the second RAT for purposes of redundancy.

Redundancy may comprise sending identical copies of the same data over both a first communication channel of the first RAT and a second communication channel of the second RAT. Alternatively, it may comprise any of a plurality of known coding approaches, wherein such first and second channel data can be used in combination to support a more robust overall flow while still providing support for redundancy and error recovery. With such coding approach, when one channel's impairment introduces an error in the data on one RAT's channel, the data is much more likely to be fully recoverable via the other RATs channel or via both channels.

Specifically, when a signal is to be sent from the wireless communication device 200 to the other wireless communication device, the MRCM controller module 310 instructs the power control module 330 to maintain both the first transmitter module 214 and the second transmitter module 224 in high-power states. The MRCM controller module 310 then forwards signals generated by the controller module 230 to both the first transmitter module 214 and the second transmitter module 224, both of which transmit the signal to the wireless communication environment 100.

Conversely, during this redundancy mode, when a signal is received from the other wireless communication device, the signal is received by the first receiver module 212 using the first RAT, and is received by the second receiver module 222 using the second RAT. After front-end processing, the received signals are forwarded to the MRCM 250.

The MRCM 250 receives the signals at its I/O module 320, which forwards the received signals to the MRCM controller module 310. Once the signals are received by the MRCM controller module 310, the MRCM controller module identifies the signals as redundancy signals and forwards them to the reconstruction module 350 for further processing. The reconstruction module 350 correlates the received signals and performs bit-correction processing in order to reconstruct (as closely as possible) the original signal sent from the other device. From this correlation, the reconstruction module 350 is able to more accurately predict error bits, and perform bit-correction on the received signal. In this manner, the accuracy of communicated signals can be enhanced.

After the reconstruction module 350 has reconstructed the signal, it forwards the reconstructed signal back to the MRCM controller module 310 along with a success flag. If the success flag indicates that the signal was successfully reconstructed (using any signal check method that is now, or will be known) the MRCM controller module 310 forwards the reconstructed signal to the I/O module 320 for forwarding to the controller module 230. If, on the other hand, the success flag indicates that the signal was unable to be successfully reconstructed, the MRCM controller module 310 issues a RESEND request to the I/O module 320 for transmission to the other device via one or more of the RAT modules. The RESEND request can be an instruction signal, a data signal, a NACK (negative-acknowledgement) signal, or simply a lack of an ACK (acknowledgement) signal.

Cross-RAT Channel Bonding

In a second scenario, both RATs may be utilized to transmit portions of a signal simultaneously. This may be done in order to increase throughput and transmission speed of signals, or may be chosen based on one or more conditions, such as channel conditions, data type, priority, etc. For example, channel conditions of a current RAT may reveal high data traffic, which can be avoided through cross-RAT channel bonding, or high priority data may be sent over a secondary RAT so as to bypass communication backups on a current RAT. The selection module 340 may select cross-RAT channel bonding for many alternative/additional reasons as particular applications may warrant.

For example, presuming that the selection module 340 has selected cross-RAT channel bonding, the MRCM controller module 310 instructs the power control module 330 to maintain both the first transmitter module 214 and the second transmitter module 224 in high-power states. The controller module 230 generates the signal for transmission, which is received by the MRCM 250 at its I/O module 320. The I/O module 320 forwards the signal to the MRCM controller module 310. Because the current mode is selected as cross-RAT channel bonding, the MRCM controller module 310 then segments the signal into one or more first RAT portions and one or more second RAT portions for transmission over the first RAT and second RAT, respectively, based on a reconstruction scheme (discussed below).

The MRCM controller module 310 then forwards the portions of the signal to the corresponding RAT modules via the I/O module 320. In particular, the MRCM controller module 310 forwards the one or more portions of the signal designated for the first RAT to the first RAT module 210 via the I/O module 320 and forwards the one or more portions of the signal designated for the second RAT to the second RAT module 220 via the I/O module 320. The first transmitter module 214 then transmits its signal portions to the wireless communication environment 100 using the first RAT and the second transmitter module 224 transmits its signal portions to the wireless communication environment 100 using the second RAT.

Similarly, when the wireless communication device 200 receives signals using cross RAT channel bonding, the first receiver module 212 receives one or more signal portions from the wireless communication environment 100 using the first PAT and the second receiver module 222 receives one or more signal portions from the wireless communication environment 100 using the second RAT. After front-end processing, the first receiver module 212 and the second receiver module 222 forward their respective signal portions to the MRCM 250.

The MRCM controller module 310 receives the signals via the I/O module 320 and identifies the received signal portions as having been sent using cross-RAT channel bonding. The MRCM controller module 310 then forwards the received signal portions to the reconstruction module 350 along with a reconstruction scheme that was previously set by the devices.

For example, in order for the reconstruction module 350 to properly reconstruct the signal from the received portions, the reconstruction module 350 must be made aware of the manner in which the portions were generated, herein referred to as a reconstruction scheme. The reconstruction scheme may be defined in advance (e.g., by standard or network), during device negotiations, or during initiation of cross-RAT channel bonding, as well as at any other suitable time. There are potentially endless possible reconstruction schemes that may be defined.

As one example, the reconstruction scheme may designate consecutive portions of the transmitted signal to alternate between the first RAT and the second RAT. In this case, the reconstruction module 350 reconstructs the signal by interleaving alternating portions of the signal received by the first receiver module 212 and the second receiver module 224. Therefore, this configuration provides a simple transmission scheme that does not require any overhead.

In an alternative reconstruction scheme, each portion may be generated to contain a consecutively-numbered identification. In this case, the reconstruction module 350 reconstructs the signal by reading the identification numbers of the received portions and reassembling the portions in numerical order. This configuration provides a particularly robust transmission scheme, as it allows the transmitting device to adjust the number of portions transmitted over each RAT as channel conditions change.

As discussed above, there may be several additional/alternative reconstruction schemes that may be devised based on the particular application, and the present disclosure should not be limited to only the specific schemes referenced above. Once reconstructed, the reconstruction module 350 forwards the reconstructed signal to the MRCM controller module 310, which forwards the reconstructed signal to the controller module 230 via the I/O module 320.

By performing cross-RAT channel bonding, the wireless communication device 200 is able to potentially increase bandwidth and/or transmission speed. Specifically, because the information can be sent in parallel over multiple communication paths, the signal can be transmitted in less time, effectively increasing throughput.

Those skilled in the relevant art(s) will recognize that although the above is described with respect to the wireless communication device 200, the same or similar methods can be employed by other wireless communication devices in the communication chain. Further, it will be appreciated that many modifications may be made to the above wireless communication device 200 within the spirit and scope of the present disclosure. For example, the wireless communication device 200 may employ alternative reconstructions schemes, and may include additional RAT modules, all or some of which may be used in the above communication scenarios.

Inter-RAT Handover

During communication, the wireless communication device 200 or the other wireless communication device (e.g., base station) may determine that the current communication scheme is unfit, or that an alternative communication scheme can better serve the communication needs of the devices. When this occurs, one of the devices may initiate a "handover" to another mutually supported RAT.

In an example, the wireless communication device 200 communicates with the other wireless communication device over a first RAT. However, based on various signals/measurements received by the MRCM 250, the selection module 340 determines that the uplink conditions of the first RAT are poor, and that the uplink conditions of the second RAT are much better. In this scenario, the wireless communication device 200 may initiate a handover with the other wireless communication device in order to transfer communications from the first RAT to the second RAT.

The selection module 340 initiates the handover, which causes the MRCM 250 to inform the other device that communication will switch. The MRCM controller module 310 then begins to cause signals to be transmitted and received on the second RAT. In other words, the MRCM controller module 310 of the MRCM 250 instructs the power control module 330 to place the second transmitter module 224 into a high-power state. The MRCM controller module 310 then begins forwarding outgoing signals to the second transmitter module 224 for transmission, and receiving signals primarily via the second receiver module 222. Once the handover has been made, the MRCM controller module 310 instructs the power control module 330 to place the first transmitter module 214 into a low-power state.

Although the above example illustrates a possible full-duplex handover, it may also be determined under certain circumstances that a half-duplex handover will better serve communications. For example, in the above scenario, the selection module 340 may also determine that the downlink conditions of the second RAT are extremely poor, and that the downlink conditions of the first RAT are much better. In this case, the selection module 340 does not select full second RAT communications but instead selects the second RAT only for the uplink communications and selects the first RAT for downlink communications. Consequently, the wireless communication device 200 informs the other device that uplink transmissions should be made via the second RAT and that downlink transmissions should continue to be made via the first RAT. The MRCM controller module 310 still instructs the power control module 330 to place the first transmitter module 214 in a low-power state, as it is not needed to receive signals.

In the above examples, the wireless communication device 200 notifies the other device e.g., base station) that it will switch communication schemes. However, in some circumstances it may be possible to forgo the notification process and instead immediately perform the switch. In particular, once the selection module 340 has set a new communication scheme, the wireless communication device 200 can report the switch to the base station via the newly-selected RAT.

For example, using the first example above, the selection module 340 sets the second RAT for communication. The MRCM controller module 310 then instructs the power control module 330 to set the first transmitter module 214 in a low-power state and forwards outgoing signals to the second transmitter module 324 via the I/O module 320. The MRCM controller module 310 then generates an notification signals, which it transmits to the current base station using the second RAT. Using a bridged or common backhaul, the base station then uses the received notification signal to stop communications using the first RAT and switching communications to the second RAT.

With the above examples and principles, the wireless communication device becomes extremely versatile with respect to handing over from one communication scheme to another. For example, the wireless communication device 200 can effectively switch from any communication scheme that uses one or more RATs to any other communication scheme that uses one or more RATs.

Those skilled in the relevant art(s) will recognize that many modifications are available relating to the handovers discussed above. For example, handovers may be initiated by either the wireless communication device 200 or the other wireless communication device, and may be initiated based on conditions other than channel conditions, such as data type, traffic, signal priority, etc., or any combination thereof. In addition, rather than initiating a full handover, the initiating device can instead perform a partial handover in order to test the capabilities of the new RAT prior to determining whether to handover. In other words, the wireless communication device 200 can commute a small portion of its transmissions to the new RAT in order to test its viability for a full handover.

An Exemplary Wireless Communication System

Figure 4:
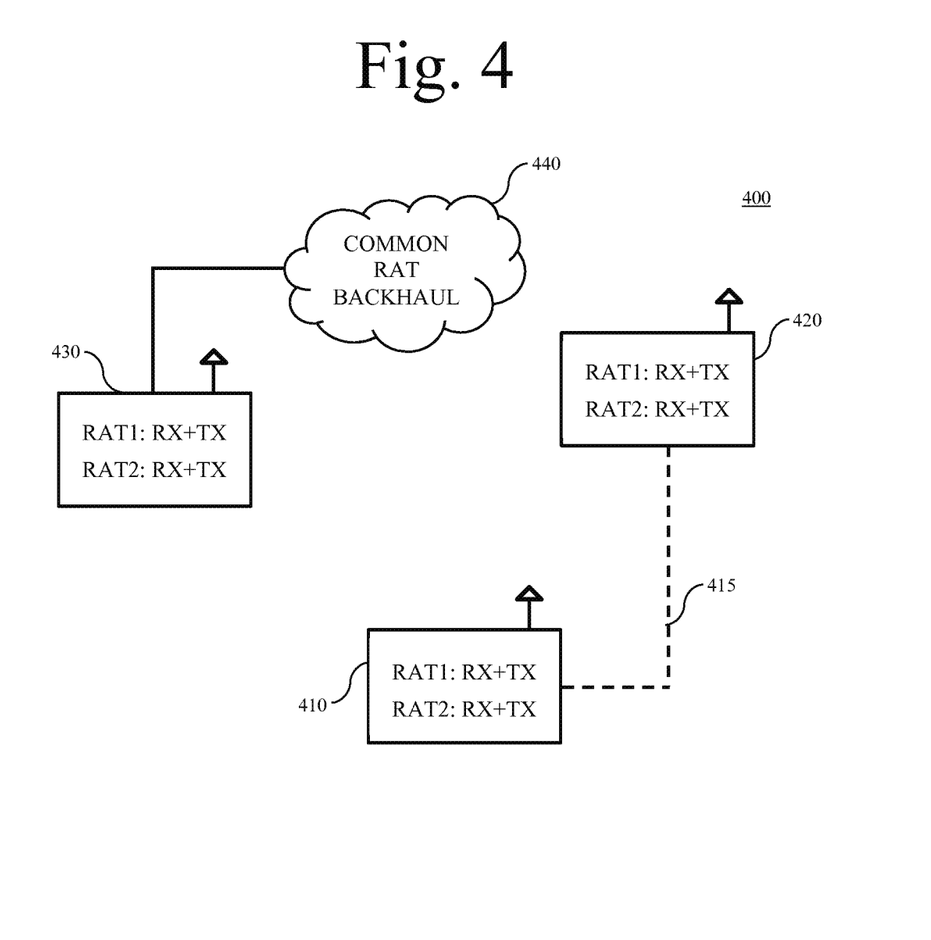
FIG. 4 illustrates a block diagram of an exemplary wireless communication system.

FIG. 4 illustrates a block diagram of a wireless communication system 400 according to an exemplary embodiment. The wireless communication system 400 includes wireless communication devices 410, 420 and 430, each of which may represent an exemplary embodiment of the wireless communication device 200, and may function as either a user device (e.g., a personal wireless device) or a base station.

For purposes of this discussion, the wireless communication device 410 will be referred to as a user equipment, the wireless communication device 420 will be referred to as an intermediate node (such as a small cell router/station or another user equipment), and the wireless communication device 430 will be referred to as a base station. Each of the devices may be capable of communicating with one or more of the other devices wirelessly using one or more RAT technologies. In addition, the user equipment 410 may be directly connected to the intermediate node 420 via a hardwire link 415.

As shown in FIG. 4, each of the wireless communication devices 410, 420 and 430 are capable of both receiving and transmitting on both the first RAT and the second RAT. In addition, the base station 430 is connected to a common RAT backhaul 440. In a hierarchical telecommunications network, the backhaul portion of the network comprises the intermediate links between the core network, or backbone, and the small subnetworks at the "edge" of the entire hierarchical network. One example of a backhaul is a core of a communications company's network that supplies connectability to various base stations. The common backhaul 440 provides a common support for, or a bridge between, different RATs. For example, the backhaul 440 may commonly serve each of the different RATs or provide a link therebetween to allow for cross-communication. With this configuration, there are many optional communication paths available for communicating between the user equipment 410 and the base station 430.

For example, the user equipment 410 can utilize the wired connection 415 in a half-duplex or full-duplex manner to transfer information to the base station 430 via the intermediate node 420. In addition, by using the common RAT backhaul 440, information designated for first RAT communication to the base station 430 can instead be communicated using the second RAT. In particular, once the base station 430 receives first RAT information over the second RAT, the information will nonetheless proceed to the common backhaul 440 for maintaining communication. Using the common backhaul 440, the base station 430 could even be notified of the receipt of the information to provide for significant communication versatility.

Communication Paths and Adaptive Migration

Figure 5:
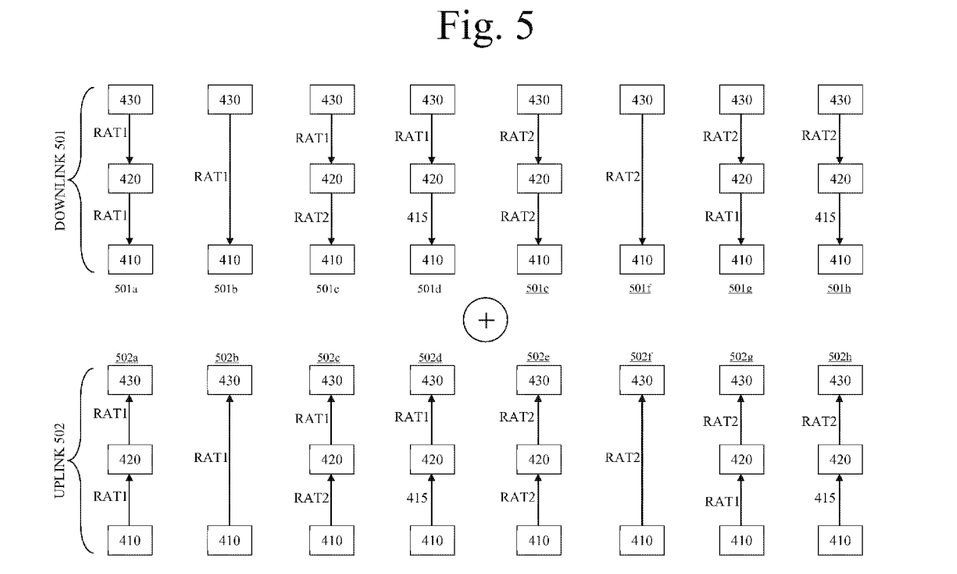
FIG. 5 illustrates a block diagram of exemplary uplink and downlink communication paths that may be implemented by the wireless communication system.

FIG. 5 illustrates a block diagram of a plurality of downlink communication paths that may be implemented by the wireless communication system 400 according to an exemplary embodiment. Each of the connected groups of boxes represents a possible communication path within the wireless communication system 400. The top row of communication paths represents possible downlink communication paths 501, whereas the bottom row represents possible uplink communication paths 502. When initiating communications or a handover, the devices may choose one or more downlink paths 501 and one or more uplink paths 502 that provide preferred communication.

For example, after analyzing various factors, the devices may determine that the second downlink path 501$b$ and the last uplink path 502$h$ will best suit their communication needs. As a result, during downlink, the base station 430 transmits signals directly to the user equipment 410 using the first RAT. During uplink, on the other hand, the user equipment 410 transmits a signal to the intermediate node 420 via the hardwire link 415. After receiving the signal from the user equipment 410, the intermediate node 420 transmits the signal to the base station 430 using the second RAT.

As can be seen from FIG. 5, numerous other combinations of downlink and uplink communication paths are available, and may be selected based on the needs of the wireless communication devices. This allows for the wireless communication devices to optimize their communication paths so as to provide preferred, or specifically-tailored, communication performance.

In addition, during communication, the devices may continue to analyze various factors, including channel conditions, power states, loading, noise, etc. in order to determine whether to migrate communications from the currently-used paths to alternative paths. The devices may choose to independently migrate one or both of the uplink and downlink path. For example (with reference to the prior example), the user equipment 410 and/or the base station 430 may determine based on one or more factors to switch from the second downlink path 501$b$ to a more suitable downlink path and/or switch from the last uplink path 502$h$ to a more suitable uplink path.

Performing such migrations during communication provide numerous advantages to the communication between the devices. In particular, migration can be initiated in order to maintain strong communication conditions, allow for channel bonding, manage dollar costs associated with a RAT, increase bandwidth, reduce power consumption, etc. By adaptively migrating to different communication paths based on current conditions and/or communication needs, the devices can optimize communication capabilities and performance.

Those skilled in the relevant art(s) will recognize that many modifications may be made to the wireless communication system 400. For example, the system 400 may include more or fewer wireless communication devices, and may further include one or more wired-only communication devices. Of course, with each additional device, the number of communication paths between the user equipment 410 and the base station 430 can increase.

Server

Figure 6:
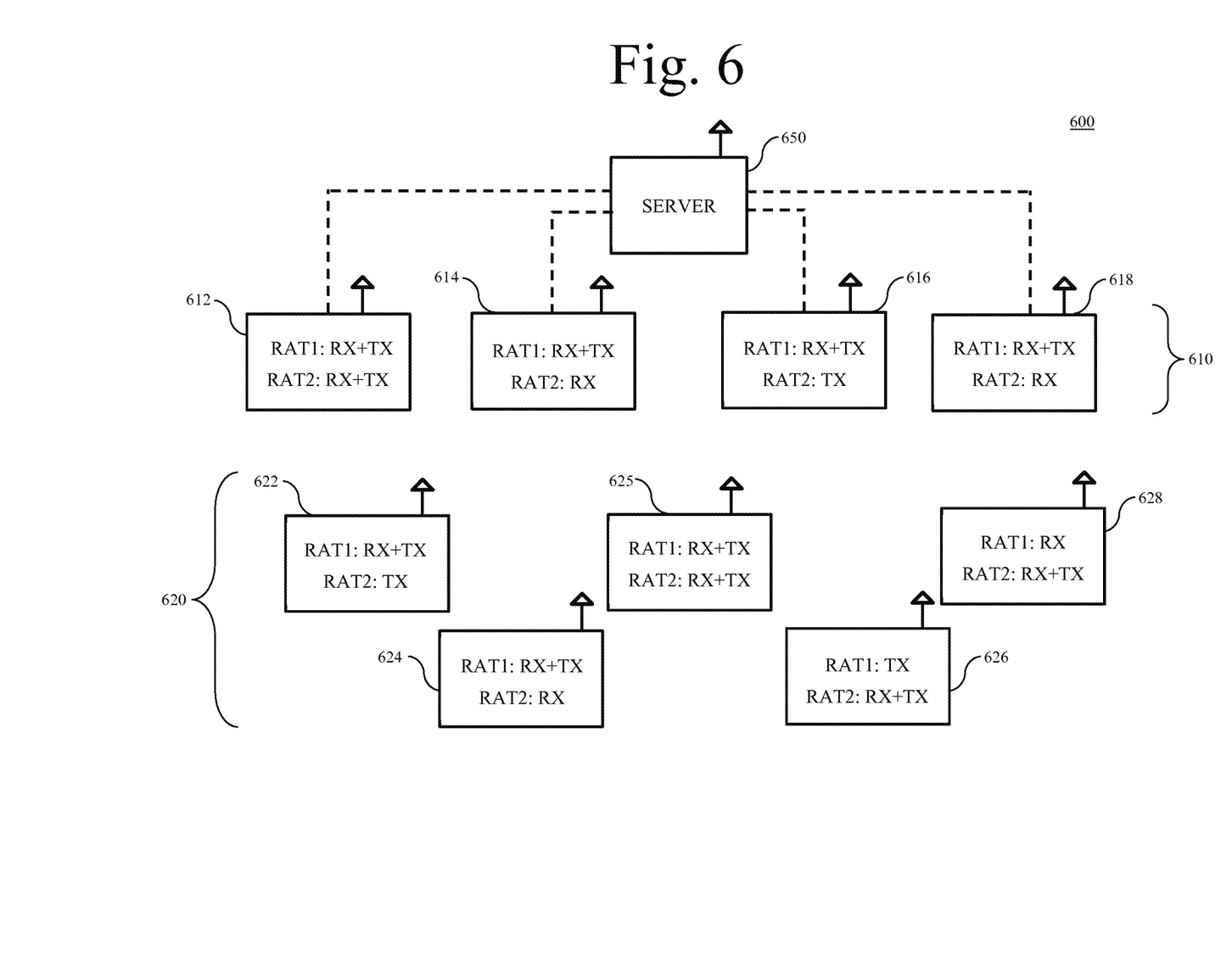
FIG. 6 illustrates a block diagram of an exemplary wireless communication system.

FIG. 6 illustrates a block diagram of a wireless communication system 600 according to an exemplary embodiment. The system 600 may include one or more base stations 610 and/or one or more user devices 620 that each may represent an exemplary wireless communication device 300. The system 600 also includes a server 650 wire-connected or wirelessly-connected to at least one base station 610.

Each of the wireless communication devices (base stations 612-618 and user devices 622-628) within the system 600 has varying communication capabilities. For example, base station 612 is capable of fully communicating within both the first RAT and the second RAT, whereas base station 614 is fully capable of communicating using the first RAT, but can only receive signals using the second RAT. The remaining wireless communication devices have capabilities in accordance with their similar labels.

Because the base stations 610 and the user devices 620 may each have different capabilities, it may be cumbersome for the wireless communication devices to repeatedly request and obtain capability information from other such devices, as well as to make channel estimates and path decisions for communications. In addition, managing the communication can become extremely burdensome for the devices with the multitude of options available for communication. As such, the system 600 includes the server 650 to track, maintain and manage various information relating to the communication between the multiple devices.

Each of the multiple devices 620 and the base stations 610 communicate underlying information regarding all available RATs (e.g., channel error conditions, current status, power concerns, dollar costs, loading, signal strengths, alternate pathways, in range alternative connection nodes and characteristics thereof, etc.) to the server 650 with or without recommendations or requests for change. The server 650 evaluates such information, requests and recommendations, and, when determined to be justified or needed, sends commands to selected ones of the multiple devices 620 and the base stations 610 to cause data and/or control flow adaptation or migration.

1. Data Management

The server 650 can be hardwire or wirelessly connected to the base stations 610. When a base station 610 obtains pertinent information, the base station 610 relays the information to the server 650. Such information may include device capabilities, device locations, device ranges, channel conditions of the first and second RATs, and activity levels within the first and second RATs, as well as any other information that may be pertinent within the spirit and scope of the present disclosure. The server 650 stores the received information so as to be easily accessed by any of the remaining base stations. Information can also be supplied and accessed by user equipment.

Accordingly, rather than repeatedly performing the cumbersome task of interrogating devices and scanning channels, the base stations 610 can acquire needed information simply by requesting the information from the server 650. The base stations 610 will have to acquire the information through other means only when the information is not already stored by the server, or when the information stored in the server requires updating (such as with channel conditions). Consequently, this becomes particularly useful with respect to device information, which is unlikely to change.

In this manner, needed information can be efficiently accessed without duplicate processing. Further, by constantly updating the server 650, the information will remain current, such that base stations 610 and/or user devices 620 can ensure proper decision-making.

2. Communication Management

In typical communication systems, user devices and/or base stations manage the half-duplex, mufti-RAT adaptation, associated half-duplex handover, and cross-RAT control signaling performed during communication. However, relying on the base stations and user devices for performing these functions significantly adds to their computing burden and potentially increases their power consumptions. Therefore, by handling various management functions at the server 650, communication can be streamlined and the burden on the base stations and user devices can be reduced.

In order to facilitate management of the communications within the system 600, the server 650 may obtain information relating to each of the user devices 620 within its range. Such information may include signal strength, base station IDs, data volumes, data types, QoS, etc. Alternatively or in addition thereto, the server 650 may obtain information relating to each of the base stations 610 within a specified area. Such information may include signal strengths, IDs of under devices 620 within range, data volume per user device, error rates, loading, etc.

From the obtained information, the server 650 may direct communication changes by transmitting instructions to the user devices 620 via one or more RAT pathway. Similarly, the server 650 may direct handover instructions to the corresponding base stations 610 which are responsible for carrying out such functionality. Using similar techniques, the server 650 can be tasked with managing or assisting in the management of numerous aspects of communication within the system 600, such as those discussed above with respect to the wireless communication device 200.

In one example, the server 650 acquires information relating to each of the base stations 610 and each of the user devices 620. From the information obtained, the server 650 scans current communication links between the user devices 620 and the base stations 610 in order to determine whether any changes are needed. During its scan, the server 650 may review the signal strengths reported by each of the devices as well as the channel conditions in the current communication links. From this information, the server determines that the user device 626, currently communicating with base station 612 using only the second RAT, has a poor communication link.

The server 650 reviews the information obtained from the other devices within the system 600 and determines that the base station 616 has a strong first RAT uplink channel and is located close to the user device 626. However, because the user device 626 does not have a first RAT receiver, the server 650 also searches its information for a viable second RAT downlink channel. Based on its search, the server 650 determines the second RAT downlink channel of the base station 616 to be a strong candidate. Consequently, the server 650 issues a handover notification to the user device 626 to handover uplink communications to the base station 616 using the first RAT and downlink communications to the base station 616 using the second RAT.

Many additional scenarios would also benefit from the use of a server 650 for managing communication changes. The server 650 could be employed to initiate all types of communication changes, including dictating RATs for communication, transmission schemes (such as redundancy and cross-RAT channel bonding), and communication path selections, as well as for monitoring conditions within the system 600 and adjusting communication as circumstances may warrant.

Those skilled in the relevant art(s) will recognize that many modifications may be made to the server within the spirit and scope of the present disclosure. For example, the server 650 can operate to fully manage communications within the system 600, or can share management responsibilities with one or more of the devices within the system 600.

Figure 7:
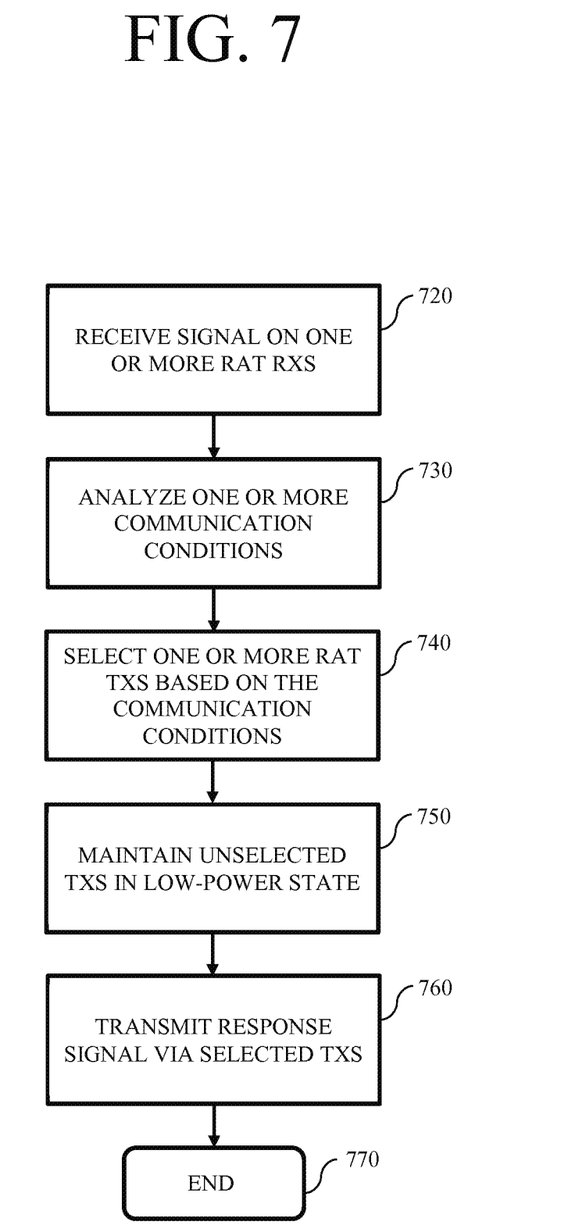
FIG. 7 illustrates a block diagram of an exemplary method for optimizing RAT usage in a wireless communication device.

An Exemplary Method Of Optimizing Radio-Access Technology Usage in A Wireless Communication Device FIG. 7 illustrates a block diagram of a method for optimizing RAT usage in a wireless communication device according to an exemplary embodiment. The wireless communication device preferably includes a first RAT transmitter and receiver, and a second RAT transmitter and receiver.

The method begins with the wireless communication device receiving a signal from another wireless communication device within a wireless network at one or more of its receivers (720). The wireless communication device analyzes one or more communication conditions (730) based on the received signal. The communication conditions may include channel conditions, data type, data priority, etc., among others within the spirit and scope of the present disclosure.

Based on the communication conditions, the wireless communication device selects a preferred transmitter (e.g., a first RAT transmitter or a second RAT transmitter) for communicating with the other wireless communication device (740). As discussed above, the wireless communication device need not select only a single transmitter, but can allocate portions of signal transmission to the first RAT transmitter and other portions of the signal transmission to the second RAT transmitter.

Once the RAT(s) has been selected, the wireless communication device sets all unselected transmitters to a low-power state in order to conserve power (750). The wireless communication device then transmits signals from the selected transmitter(s) back to the other wireless communication device (760). In this manner, the devices communicate with one another, and the method ends (770).

Those skilled in the relevant art(s) will recognize that the method can additionally or alternatively include any of the functionality of the wireless communication device 200 discussed above, and the above description of the exemplary method should neither be construed to limit the method nor the description of the wireless communication device 200.

CONCLUSION

It is to be appreciated that the Detailed Description, and not the Abstract, is intended to be used to interpret the claims. The Abstract may set forth one or more, but not all exemplary embodiments and thus, is not intended to limit the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A service node within a wireless communication environment that is supported by a communication architecture and that is configured to coordinate communication between a network backhaul and a wireless communication device using a first communication pathway and a second communication pathway, the communication architecture having a first access node that has a first access requirement for communication on the first communication pathway, a second access node that has a second access requirement different from the first access requirement for communication on the second communication pathway, the service node comprising:
    a transmitter module configured to transmit on the first communication pathway and the second communication pathway;
    a receiver module configured to receive from the first communication pathway and the second communication pathway; and
    a control module configured to coordinate the communication between the network backhaul and the wireless communication device by enabling one of upstream communication or downstream communication between the network backhaul and the wireless communication device via the first communication pathway, and to enable the other of upstream communication or downstream communication between the network backhaul and the wireless communication device via the second communication pathway.

2. The service node of claim 1, wherein at least one of the first communication pathway or the second communication pathway is supported by an intermediate node.

3. The service node of claim 1, wherein the control module includes a power control module configured to direct at least one of a transmitter and a receiver within the wireless communication device to enter a low power state.

4. The service node of claim 1, wherein the control module is further configured to receive acknowledgement signals from the wireless communication device via the first communication pathway for communications that took place between the wireless communication device and the network backhaul on the second communication pathway.

5. The service node of claim 1, wherein the control module is configured to set link aggregation as part of coordinating the communication between the network backhaul and the wireless communication device.

6. The service node of claim 1, wherein the control module is configured to coordinate the communication between the network backhaul and the wireless communication device by enabling upstream communication from the wireless communication device to the network backhaul via the first communication pathway, and by enabling downstream communication from the network backhaul to the wireless communication device via the second communication pathway.

7. The service node of claim 1, wherein the communication on the first communication pathway occurs in a different frequency band than the communication on the second communication pathway.

8. A service node supported by a wireless communication environment, the service node comprising:
    a first communication link configured to communicate with a wireless communication device via a first communication path;

a second communication link configured to communicate with an access node that is capable of communicating with the wireless communication device via a second communication path; and a multi-path coordination module configured to select a communication scheme from among the group of a single path communication scheme, a half-duplex multiple path communication scheme, or a full-duplex multiple path communication scheme, and to set, as a current communication scheme for communicating with the wireless communication device the selected communication scheme.

9. The service node of claim 8, wherein for the half-duplex multiple path communication scheme, the multi-path coordination module is configured to enable upstream communication of the wireless communication device via only the second communication path and enables downstream communication of the wireless communication device via only the first communication path.

10. The service node of claim 8, wherein the multi-path coordination module is configured to set the communication scheme based on at least one parameter, including channel conditions, traffic, data type, data priority, power consumption, and cost.

11. The service node of claim 8, further comprising a power control module configured to set a transmitter module of at least one of the service node or the wireless communication device to a low power state based on the set communication scheme.

12. The service node of claim 8, wherein for the full-duplex multiple path communication scheme, the multi-path coordination module is configured to enable one of standard communication, redundant communication, or link aggregation communication by the wireless communication device.

13. The service node of claim 8, wherein the first communication path and the second communication path operate in different frequency bands.

14. A service node, within a wireless communication environment that is supported by a communication architecture, configured to coordinate communication between a network backhaul and a wireless communication device using a first communication pathway and a second communication pathway, the communication architecture having a first access node that has a first access requirement for communication on the first communication pathway, a second access node that has a second access requirement different from the first access requirement for communication on the second communication pathway, the service node comprising:

a transmitter module configured to transmit to the first access node and to the second access node;

a receiver module configured to receive from the first access node and from the second access node; and a control module configured to:

identify the second access node using the receiver module;

assess a usability of the second access node; and coordinate the communication between the network backhaul and the wireless communication device by enabling one of upstream communication or downstream communication between the network backhaul and the wireless communication device via the first communication pathway, and to enable the other of upstream communication or downstream communication between the network backhaul and the wireless communication device via the second communication pathway, based on the assessment of the usability of the second access node.

15. The service node of claim 14, wherein at least one of the first communication pathway or the second communication pathway is supported by an intermediate node.

16. The service node of claim 14, wherein the control module includes a power control module configured to direct at least one of a transmitter and a receiver within the wireless communication device to enter a low power state.

17. The service node of claim 14, wherein the control module is further configured to receive acknowledgement signals from the wireless communication device via the first communication pathway for communications that took place between the wireless communication device and the network backhaul on the second communication pathway.

18. The service node of claim 14, wherein the control module is configured to set link aggregation as part of coordinating the communication between the network backhaul and the wireless communication device.

19. The service node of claim 14, wherein the control module is configured to coordinate the communication between the network backhaul and the wireless communication device by enabling upstream communication from the wireless communication device to the network backhaul via the first communication pathway, and by enabling downstream communication from the network backhaul to the wireless communication device via the second communication pathway.

20. The service node of claim 14, wherein the communication on the first communication pathway occurs in a different frequency band than the communication on the second communication pathway.

* * * * *